US012789830B2

(12) United States Patent
Masuda

(10) Patent No.: US 12,789,830 B2
(45) Date of Patent: Nov. 10, 2026

(54) INFORMATION PROCESSING DEVICE, VEHICLE, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventor: Katsuhiro Masuda, Ibi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/925,347

(22) Filed: Oct. 24, 2024

(65) Prior Publication Data

US 2025/0171044 A1 May 29, 2025

(30) Foreign Application Priority Data

Nov. 29, 2023 (JP) ................................ 2023-201728

(51) Int. Cl.

*B60W 50/14* (2020.01)
*B60K 35/28* (2024.01)
*G06F 11/14* (2026.01)
*G06F 11/32* (2006.01)

(52) U.S. Cl.

CPC ............. *B60W 50/14* (2013.01); *B60K 35/28* (2024.01); *G06F 11/1433* (2013.01); *G06F 11/327* (2013.01); *B60W 2050/146* (2013.01)

(58) Field of Classification Search

CPC ........... B60W 50/14; B60W 2050/146; B60W 50/0205; B60W 2050/046; B60W 50/04; B60W 50/045; B60K 35/28; G06F 11/1433; G06F 11/327; G06F 8/65; G06F 9/451

See application file for complete search history.

(56) References Cited

U.S. PATENT DOCUMENTS

2015/0301821 A1* 10/2015 Danne ..................... H04L 67/06 717/169
2018/0074811 A1 3/2018 Kiyama et al.
2019/0222484 A1* 7/2019 Ricci ..................... G08C 19/00
2022/0317992 A1 10/2022 Inoue
2022/0334821 A1 10/2022 Sakai

FOREIGN PATENT DOCUMENTS

JP 2018045515 A 3/2018
JP 2022-163396 A 10/2022
JP 2022154490 A 10/2022

* cited by examiner

*Primary Examiner* — Quan Zhen Wang
*Assistant Examiner* — Rajsheed O Black-Childress
(74) *Attorney, Agent, or Firm* — Oliff PLC

(57) ABSTRACT

An information processing device is configured to control a display unit configured to display information on software update for an in-vehicle electronic device. The information processing device includes a circuitry configured to: display guidance information on the display unit under a condition that an update error in which the software update is not performable properly has occurred; and select first guidance information or second guidance information to be displayed on the display unit as the guidance information based on a situation in which the update error has occurred. The first guidance information indicates a procedure for resolving the update error that is practicable by a user of a vehicle. The second guidance information indicates that the vehicle needs to be brought to a dealer.

9 Claims, 3 Drawing Sheets

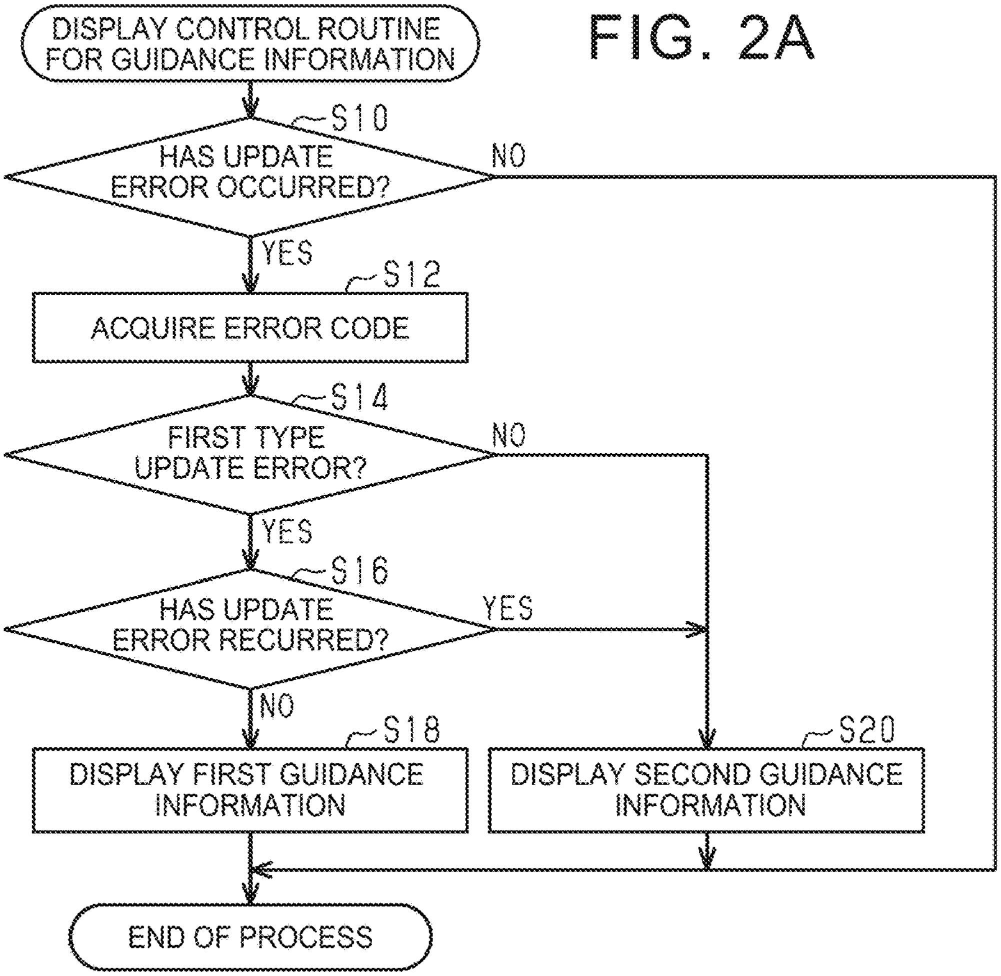
FIG. 2A
FIG. 2B
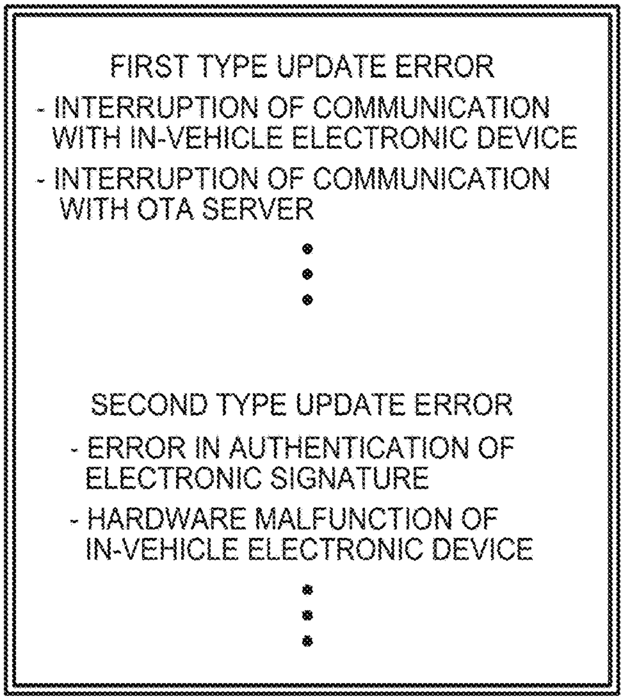

INFORMATION PROCESSING DEVICE, VEHICLE, INFORMATION PROCESSING METHOD, AND NON-TRANSITORY STORAGE MEDIUM

CROSS-REFERENCE TO RELATED APPLICATION

This application claims priority to Japanese Patent Application No. 2023-201728 filed on Nov. 29, 2023, incorporated herein by reference in its entirety.

BACKGROUND

1. Technical Field

The present disclosure relates to an information processing device, a vehicle, an information processing method, and a non-transitory storage medium.

2. Description of Related Art

Vehicles include various in-vehicle electronic devices that operate through execution of software. As disclosed in Japanese Unexamined Patent Application Publication No. 2022-163396 (JP 2022-163396 A), there is known an over-the-air (OTA) technology in which vehicle functions are added or changed by updating software of an in-vehicle electronic device using software downloaded from outside a vehicle by wireless communication.

SUMMARY

There is a possibility of such an update error that the software of an in-vehicle electronic device cannot be updated properly. If the update error has occurred and the user is notified only of the fact that the update has failed, the user may be confused because the user does not know how to handle the error. In particular, when the user can resolve the error by himself or herself, the user may want to know how to resolve the error. When the user cannot resolve the error by himself or herself and needs to bring the vehicle to the dealer, the user may want to know the need to bring the vehicle to the dealer.

An information processing device according to an embodiment of the present disclosure is configured to control a display unit configured to display information on software update for an in-vehicle electronic device. The information processing device includes a circuitry. The circuitry is configured to: display guidance information on the display unit under a condition that an update error in which the software update is not performable properly has occurred; and select first guidance information or second guidance information to be displayed on the display unit as the guidance information based on a situation in which the update error has occurred. The first guidance information indicates a procedure for resolving the update error that is practicable by a user of a vehicle. The second guidance information indicates that the vehicle needs to be brought to a dealer.

The circuitry may be configured to select the first guidance information as the guidance information under a condition that the update error has occurred due to an interruption of communication with the in-vehicle electronic device.

The circuitry may be configured to select the first guidance information as the guidance information under a condition that the update error has occurred due to an interruption of communication with the in-vehicle electronic device and the in-vehicle electronic device is switchable ON and OFF in conjunction with an operation on a power switch of the vehicle.

The circuitry may be configured to select the first guidance information as the guidance information under a condition that the update error has occurred due to an interruption of communication between the vehicle and an external distribution center configured to distribute software update data.

The circuitry may be configured to select the second guidance information as the guidance information under a condition that the update error has occurred through determination that an electronic signature assigned to software update data is not a valid signature.

The circuitry may be configured to select the second guidance information as the guidance information under a condition that the update error has occurred due to a hardware malfunction of the in-vehicle electronic device.

The circuitry may be configured to select the second guidance information as the guidance information under a condition that the update error has recurred after display of the first guidance information.

An embodiment of the present disclosure relates to a vehicle including the information processing device.

An embodiment of the present disclosure relates to an information processing method for controlling a display unit configured to display information on software update for an in-vehicle electronic device. The information processing method includes: displaying guidance information under a condition that an update error in which the software update is not performable properly has occurred; and selecting first guidance information or second guidance information to be displayed on the display unit as the guidance information based on a situation in which the update error has occurred. The first guidance information indicates a procedure for resolving the update error that is practicable by a user of a vehicle. The second guidance information indicates that the vehicle needs to be brought to a dealer.

An embodiment of the present disclosure relates to a non-transitory storage medium storing instructions that are executable by one or more processors and that cause the one or more processors to perform functions including: displaying guidance information on a display unit configured to display information on software update for an in-vehicle electronic device under a condition that an update error in which the software update is not performable properly has occurred; and selecting first guidance information or second guidance information to be displayed on the display unit as the guidance information based on a situation in which the update error has occurred. The first guidance information indicates a procedure for resolving the update error that is practicable by a user of a vehicle. The second guidance information indicates that the vehicle needs to be brought to a dealer.

The information processing device, the vehicle, the information processing method, and the non-transitory storage medium described above provide an effect of facilitating handling of the update error in the software of the in-vehicle electronic device.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 2A is a flowchart of a display control routine for update error guidance information that is performed by the information processing device of the first embodiment;

FIG. 2B shows an example of a first type update error and a second type update error;

DETAILED DESCRIPTION OF EMBODIMENTS

Hereinafter, an information processing device, a vehicle, an information processing method, and a non-transitory storage medium according to an embodiment will be described in detail with reference to FIGS. 1 to 4.

Configurations of Information Processing Device and Vehicle

Figure 1:
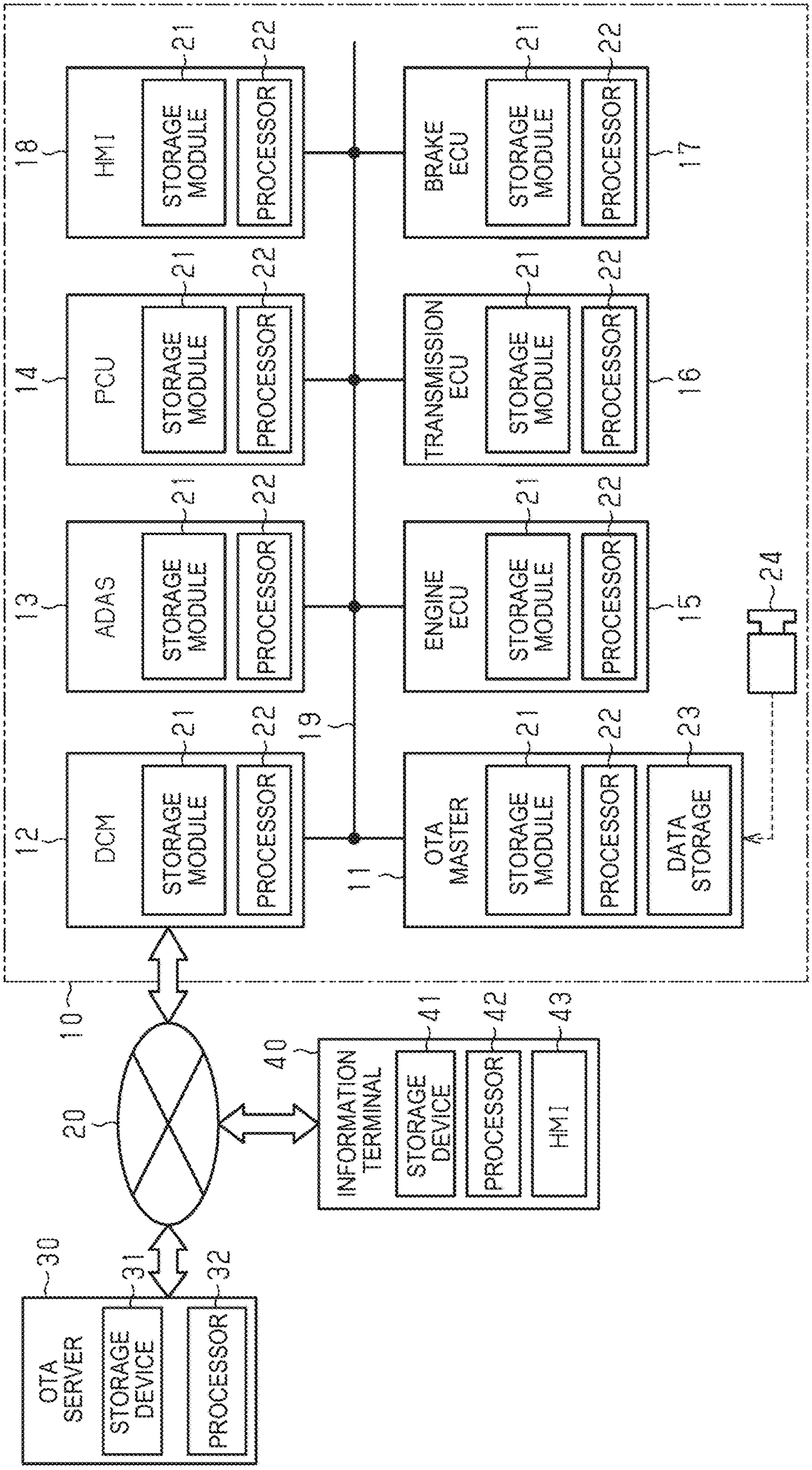
FIG. 1 schematically shows the configurations of an information processing device and a vehicle according to a first embodiment.

First, the configurations of the information processing device and the vehicle according to the present embodiment will be described with reference to FIG. 1. As shown in FIG. 1, a vehicle 10 includes electronic devices such as an OTA master 11, a DCM 12, an ADAS 13, a PCU 14, an engine ECU 15, a transmission ECU 16, a brake ECU 17, and an HMI 18. In the following description, the electronic devices mounted on the vehicle 10 will be referred to as “in-vehicle electronic devices”. The in-vehicle electronic devices are connected to each other via an in-vehicle network 19 to communicate with each other. The OTA master 11 manages software update of the in-vehicle electronic devices including the OTA master 11 itself. The DCM 12 is a data communication module that provides a function of wireless communication with the outside of the vehicle via a mobile communication network 20. In the present embodiment, the DCM 12 has a function of recording results of self-diagnosis performed by the in-vehicle electronic devices and transmitting the results to a data center etc. outside the vehicle. The ADAS 13 is an advanced driving assistant system that provides advanced driving assistant functions such as an automatic braking device and a sudden acceleration prevention device. The PCU 14 is a power control unit that performs power control inside the vehicle. The engine ECU 15 is an electronic control unit for controlling an engine. The transmission ECU 16 is an electronic control unit for controlling a transmission. The brake ECU 17 is an electronic control unit for controlling brakes. The HMI 18 is a human-machine interface. The HMI 18 includes an input device that receives operations by occupants and a display device that displays information for the occupants using images and audio. The HMI 18 may have a navigation function for providing route guidance and an entertainment function for playing music and videos. Each of these in-vehicle electronic devices includes a storage module 21 that stores software, and a processor 22 that executes the software. The OTA master 11 further includes a data storage 23 that stores update software acquired from outside the vehicle.

The vehicle 10 includes a power switch 24 for switching the power of the vehicle 10 between ON and OFF. The drive system of the vehicle 10 starts in response to switching from power OFF to power ON, and stops in response to switching from power ON to power OFF.

The vehicle 10 is connected to an OTA server 30 via the mobile communication network 20. The OTA server 30 is a server device that distributes update data of software for in-vehicle electronic devices. The OTA server 30 includes a storage device 31 that stores programs and data for distributing update data, and a processor 32 that executes the programs for distribution.

The OTA server 30 can communicate with an information terminal 40 of a user of the vehicle 10 via the mobile communication network 20. Examples of the information terminal 40 include a smartphone. The information terminal 40 may be a tablet terminal or a personal computer (PC) terminal. The information terminal 40 includes a storage device 41, a processor 42, and an HMI 43. The processor 42 reads and executes software stored in the storage device 41. The HMI 43 includes an input device that receives operations by the user and a display device that displays information for the user. The software stored in the storage device 41 includes software that provides functions such as information checking about the vehicle 10 owned by the user and remote control on the vehicle 10.

Overview of Software Update

Next, an overview of software update for the in-vehicle electronic devices of the vehicle 10 will be described. The in-vehicle electronic devices to be subjected to software update include the OTA master 11, the DCM 12, the ADAS 13, the PCU 14, the engine ECU 15, the transmission ECU 16, the brake ECU 17, and the HMI 18. The software update proceeds through a download phase, an installation phase, and an activation phase.

In the download phase, update software is transmitted from the OTA server 30 to the vehicle 10. The OTA master 11 stores the update software received from the OTA server 30 in the data storage 23. The download phase includes a series of processes related to download, such as determination as to whether download can be performed and verification of update data. The update data has an electronic signature. The update data is verified by checking whether the electronic signature is a valid signature. The transmission of the update software from the OTA server 30 to the OTA master 11 may include transmission of compressed data obtained by compressing the update software, transmission of divided data obtained by dividing the update software or the compressed data, or collective transmission of pieces of update software for a plurality of in-vehicle electronic devices.

In the installation phase, the update software is installed in the update target in-vehicle electronic device. In the installation phase, the OTA master 11 installs the update software in the storage module 21 of the update target in-vehicle electronic device based on the update data downloaded to the data storage 23. The installation phase includes a series of processes related to installation, such as determination as to whether installation can be performed, transfer of the update data, and verification of the update software. When the update data includes the update software, the OTA master 11 transfers the update data to the update target in-vehicle electronic device in the installation phase. When the update data includes compressed data, difference data, or divided data of the update software, a process of generating the update software from the update data is performed. The generating process may be performed by the OTA master 11 or by the update target in-vehicle electronic device. The update software can be generated by decompressing the compressed data or assembling the difference data or the divided data. When the installation phase is completed, the update software is disabled.

In the activation phase, the update software is activated, that is, enabled, in the update target in-vehicle electronic device. The activation phase includes a series of processes related to activation, such as determination as to whether activation can be performed, a check on the compatibility of the updated software, and verification of the result of the activation.

Display Control for Update Error Guidance Information

Display control for update error guidance information that is performed by the OTA master 11 will be described in detail with reference to FIGS. 2 to 4. The display control is control for displaying guidance information on the HMI 18 in the event of such an update error that the software update for an in-vehicle electronic device cannot be performed properly.

FIG. 2A shows the processing procedure of a display control routine that is performed by the OTA master 11 for the display control. The OTA master 11 repeats this routine at every predetermined control cycle during the software update for an in-vehicle electronic device. The process of this routine is performed by the processor 22 of the OTA master 11 executing a program stored in the storage module 21.

When this routine is started, the OTA master 11 checks whether an update error has occurred (S10). When no update error has occurred (NO), the OTA master 11 terminates the process of this routine in the current control cycle.

When an update error has occurred (YES), the OTA master 11 acquires an error code (S12). The error code indicates the situation in which the update error has occurred. The error code is generated by the OTA master 11 or the in-vehicle electronic device that has recognized the occurrence of the update error.

Next, the OTA master 11 determines whether the current update error is a first type update error or a second type update error based on the error code. FIG. 2B shows an example of the first type update error and the second type update error. The storage module 21 of the OTA master 11 prestores classification information to be used for the determination. The classification information indicates classification of error codes associated with the first type update error and the second type update error. The first type update error is an update error that the user of the vehicle 10 can resolve by himself or herself. The second type update error is an update error that the user has difficulty in resolving, and the user needs to bring the vehicle 10 to a dealer for repair and inspection to resolve the update error.

The first type update error includes update errors that occur in situations (A) and (B). Situation (A) is an interruption of communication between the OTA master 11 and the update target in-vehicle electronic device. Situation (B) is an interruption of communication between the OTA server 30 and the vehicle 10. Situations (A) and (B) may occur due to a communication failure in the in-vehicle network 19 or a communication failure between the vehicle 10 and the mobile communication network 20 via the DCM 12. These communication failures may be resolved by powering ON the vehicle 10 again and resetting the communication settings of the in-vehicle electronic devices. Powering the vehicle 10 ON again refers to switching the power of the vehicle 10 from ON to OFF and then switching the power to ON again.

The in-vehicle electronic devices include an in-vehicle electronic device that can be switched ON and OFF in conjunction with the power of the vehicle 10, and an in-vehicle electronic device that cannot be switched ON and OFF in this way. The communication settings of the in-vehicle electronic device that cannot be switched ON and OFF in conjunction with the power of the vehicle 10 are not reset even when the vehicle 10 is powered ON again. If an update error has occurred in situation (A) during software update for such an in-vehicle electronic device, there is a possibility that the update error cannot be resolved by powering the vehicle 10 ON again. Therefore, the update error may be classified as the second type update error even in situation (A) when the update target in-vehicle electronic device cannot be switched ON and OFF in conjunction with the operation on the power switch 24 of the vehicle 10. That is, the update error may be classified as the first type update error only when the update error occurs due to an interruption of communication with the in-vehicle electronic device and the in-vehicle electronic device can be switched ON and OFF in conjunction with the operation on the power switch 24 of the vehicle 10.

The second type update error includes update errors that occur in situations (C) and (D). Situation (C) is an error in authentication of an electronic signature of update data. Specifically, situation (C) is a case where the electronic signature of the update data distributed from the OTA server 30 has proved not to be a valid signature. Situation (D) is a hardware malfunction of the update target in-vehicle electronic device. In situation (C), the vehicle 10 may be subjected to a cyberattack and unauthorized software update may be attempted. In situation (D), the in-vehicle electronic device needs to be repaired or replaced to resolve the update error.

When the OTA master 11 determines that the current update error is the first type update error (S14: YES), the OTA master 11 checks whether the update error is a recurring update error (S16). Specifically, the OTA master 11 checks whether a similar update error has occurred previously in the current software update. When the OTA master 11 determines that the current update error is not a recurring update error (S16: NO), the OTA master 11 displays first guidance information on the HMI 18. The first guidance information indicates an update error resolving procedure that is practicable by the user of the vehicle 10 by himself or herself. For example, the update error resolving procedure in situations (A) and (B) is to switch the power of the vehicle 10 to OFF and then switch the power to ON again. After the HMI 18 displays the first guidance information, the OTA master 11 terminates the process of this routine in the current control cycle.

When the OTA master 11 determines that the current update error is the second type update error (S14: NO), the OTA master 11 displays second guidance information on the HMI 18 (S20). The second guidance information indicates that the vehicle 10 needs to be brought to a dealer. When the OTA master 11 determines that the current update error is the first type update error (S14: YES) and that the update error is a recurring update error (S16: YES), the OTA master 11 displays the second guidance information on the HMI 18 (S20). After the HMI 18 displays the second guidance information, the OTA master 11 terminates the process of this routine in the current control cycle.

Figure 3:
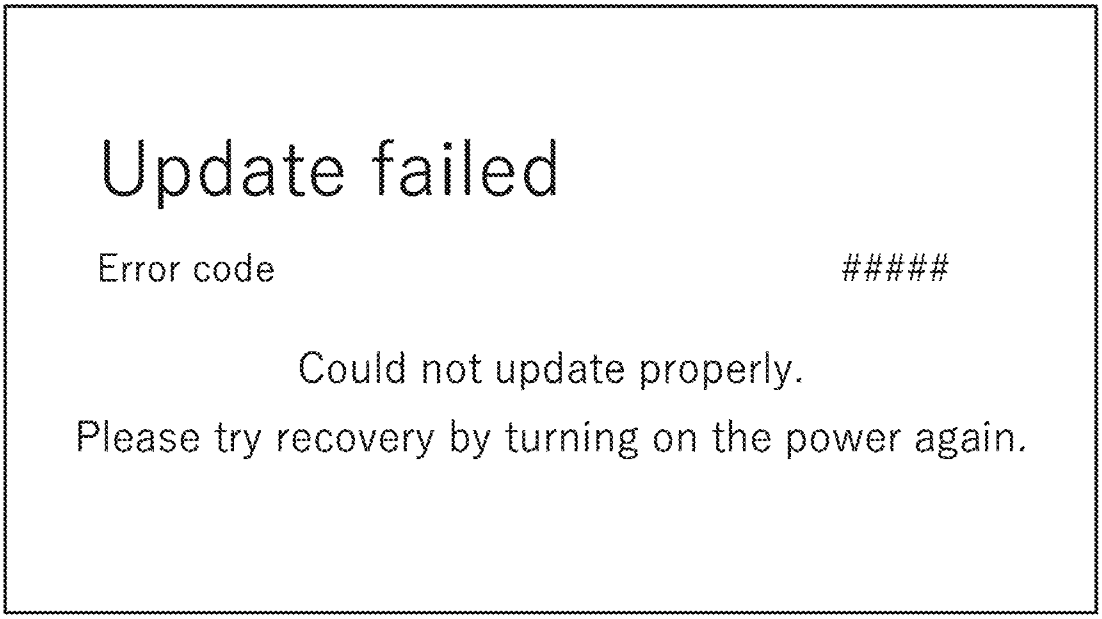
FIG. 3 shows a display example of an image showing first guidance information.

FIG. 3 shows an example of an image displayed on the HMI 18 and showing the first guidance information. FIG. 4 shows an example of an image displayed on the HMI 18 and showing the second guidance information. The symbol "######" in FIGS. 3 and 4 represents the value of the error code. Each image shows information indicating that an update error has occurred, and an error code of the update error that has occurred. In the image in FIG. 3, a message for prompting the user to retry turning ON the vehicle 10 is displayed as the first guidance information. In the image in FIG. 4, a message for prompting the user to consult a local dealer is displayed as the second guidance information.

Functions and Effects of Embodiment

Functions and effects of the present embodiment will be described. The OTA master 11 displays the guidance information on the HMI 18 in the event of such an update error that the software update for an in-vehicle electronic device cannot be performed properly. The OTA master 11 selects either of the first guidance information and the second guidance information to be displayed on the HMI 18 as the guidance information based on the situation in which the update error has occurred. The first guidance information indicates an update error resolving procedure that is practicable by the user of the vehicle 10 by himself or herself. The second guidance information indicates that the vehicle 10 needs to be brought to a dealer.

The information processing device, the vehicle, the information processing method, and the non-non-transitory storage medium according to the present embodiment provide the following effects.

By viewing the guidance information displayed on the HMI 18 in the event of an update error, the user of the vehicle 10 can know the action required to resolve the update error. Therefore, the information processing device, the vehicle, the information processing method, and the non-transitory storage medium according to the present embodiment provide an effect of facilitating handling of the update error in the software of the in-vehicle electronic device.

When an update error classified as the first type update error has occurred, there is a possibility that the update error is not resolved though the resolution procedure displayed as the first guidance information is carried out. When the same resolution procedure is provided after the update error recurs in this case, the resolution of the update error is not expected. When a similar update error recurs after the first guidance information is displayed, the OTA master 11 displays the second guidance information on the HMI 18. Therefore, the user can know an appropriate action against the recurrence of the update error that has not been resolved by the provided procedure.

In the present embodiment, the HMI 18 is an example of a display unit configured to display information on software update for an in-vehicle electronic device. The OTA master 11 is an example of an information processing device configured to control the HMI 18 that is an example of the display unit. The storage module 21 of the OTA master 11 that stores the program for the process of the display control routine for the update error guidance information is an example of the non-transitory storage medium of the present disclosure.

Other Embodiments

The above embodiment can be modified as follows. The above embodiment and the following modifications can be combined as long as no technical contradiction arises.

When an update error has occurred, the guidance information may be displayed on the information terminal 40 owned by the user. When the update error has occurred in this case, the OTA master 11 transmits an error code to the OTA server 30. The OTA server 30 determines whether the update error that has occurred is the first type update error or the second type update error based on the received error code. The OTA server 30 instructs the information terminal 40 owned by the user to display the first guidance information when determination is made that the update error is the first type update error, and instructs the information terminal 40 to display the second guidance information when the update error is the second type update error. In this case, the information terminal 40 is an example of the display unit of the present disclosure, and the OTA server 30 is an example of the information processing device of the present disclosure. The storage device 31 of the OTA server is an example of the non-transitory storage medium of the present disclosure.

A resolution procedure other than powering the vehicle 10 ON again may be displayed as the first guidance information. Even the case of the first type update error, the details of the resolution procedure to be displayed as the first guidance information may be varied depending on the situation of the occurrence.

Figure 4:
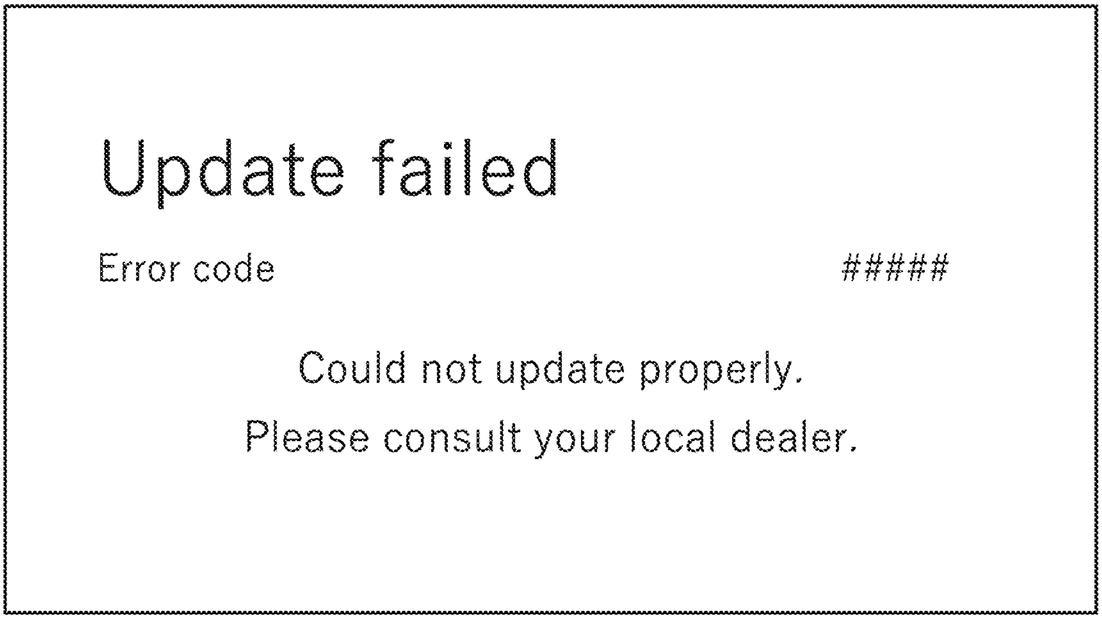
FIG. 4 shows a display example of an image showing second guidance information.

The images in FIGS. 3 and 4 show the guidance information using texts. These images may show the guidance information using expressions other than texts, such as still images or videos.

The OTA master 11 that manages the software update controls the display of the information on the software update. The management of the software update and the display control on the information on the software update may be performed by another in-vehicle device. For example, the control on the information to be displayed on the HMI 18 in the first embodiment may be performed by an in-vehicle device that is the target of the software update.

The information processing device of the present disclosure may be configured as a circuit including one or more processors that operate according to a computer program, one or more dedicated hardware circuits such as dedicated hardware that performs at least part of various processes, or a combination thereof. Examples of the dedicated hardware include an application-specific integrated circuit (ASIC). The processor includes a central processing unit (CPU) and a memory such as a random access memory (RAM) and a read only memory (ROM). The memory stores program codes or instructions configured to cause the CPU to perform processes. The memory, that is, a storage medium, includes any available media that can be accessed by a general purpose or special purpose computer. The information processing device of the present disclosure may include one, two, or more memories.

APPENDICES

[Appendix 1] An information processing device configured to control a display unit configured to display information on software update for an in-vehicle electronic device, the information processing device being configured to: display guidance information on the display unit when an update error in which the software update is not performable properly has occurred; and select which of first guidance information indicating a procedure for resolving the update error that is practicable by a user of a vehicle and second guidance information indicating that the vehicle needs to be brought to a dealer is to be displayed on the display unit as the guidance information based on a situation in which the update error has occurred.

[Appendix 2] The information processing device according to Appendix 1, in which the information processing device is configured to select the first guidance information as the guidance information when the update error has occurred due to an interruption of communication with the in-vehicle electronic device.

[Appendix 3] The information processing device according to Appendix 1 or 2, in which the information processing device is configured to select the first guidance information as the guidance information when the update error has occurred due to an interruption of communication with the in-vehicle electronic device and the in-vehicle electronic device is switchable ON and OFF in conjunction with an operation on a power switch of the vehicle.

[Appendix 4] The information processing device according to any one of Appendices 1 to 3, in which the information processing device is configured to select the first guidance information as the guidance information when the update error has occurred due to an interruption of communication between the vehicle and an external distribution center configured to distribute software update data.

[Appendix 5] The information processing device according to any one of Appendices 1 to 4, in which the information processing device is configured to select the second guidance information as the guidance information when the update error has occurred through determination that an electronic signature assigned to software update data is not a valid signature.

[Appendix 6] The information processing device according to any one of Appendices 1 to 5, in which the information processing device is configured to select the second guidance information as the guidance information when the update error has occurred due to a hardware malfunction of the in-vehicle electronic device.

[Appendix 7] The information processing device according to any one of Appendices 1 to 6, in which the information processing device is configured to select the second guidance information as the guidance information when the update error has recurred after display of the first guidance information.

[Appendix 8] A vehicle including the information processing device according to any one of Appendices 1 to 7.

[Appendix 9] An information processing method for controlling a display unit configured to display information on software update for an in-vehicle electronic device, the information processing method including: displaying guidance information on the display unit when an update error in which the software update is not performable properly has occurred; and selecting which of first guidance information indicating a procedure for resolving the update error that is practicable by a user of a vehicle and second guidance information indicating that the vehicle needs to be brought to a dealer is to be displayed on the display unit as the guidance information based on a situation in which the update error has occurred.

[Appendix 10] The information processing method according to Appendix 9, in which the first guidance information is selected as the guidance information when the update error has occurred due to an interruption of communication with the in-vehicle electronic device.

[Appendix 11] The information processing method according to Appendix 9 or 10, in which the first guidance information is selected as the guidance information when the update error has occurred due to an interruption of communication with the in-vehicle electronic device and the in-vehicle electronic device is switchable ON and OFF in conjunction with an operation on a power switch of the vehicle.

[Appendix 12] The information processing method according to any one of Appendices 9 to 11, in which the first guidance information is selected as the guidance information when the update error has occurred due to an interruption of communication between the vehicle and an external distribution center configured to distribute software update data.

[Appendix 13] The information processing method according to any one of Appendices 9 to 12, in which the second guidance information is selected as the guidance information when the update error has occurred through determination that an electronic signature assigned to software update data is not a valid signature.

[Appendix 14] The information processing method according to any one of Appendices 9 to 13, in which the second guidance information is selected as the guidance information when the update error has occurred due to a hardware malfunction of the in-vehicle electronic device.

[Appendix 15] The information processing method according to any one of Appendices 9 to 14, in which the second guidance information is selected as the guidance information when the update error has recurred after display of the first guidance information.

[Appendix 16] A program to be executed by an information processing device configured to control a display unit configured to display information on software update for an in-vehicle electronic device, the program causing the information processing device to perform: a display process of displaying guidance information on the display unit when an update error in which the software update is not performable properly has occurred; and a selection process of selecting which of first guidance information indicating a procedure for resolving the update error that is practicable by a user of a vehicle and second guidance information indicating that the vehicle needs to be brought to a dealer is to be displayed on the display unit as the guidance information based on a situation in which the update error has occurred.

[Appendix 17] The program according to Appendix 16, in which the selection process is a process of selecting the first guidance information as the guidance information when the update error has occurred due to an interruption of communication with the in-vehicle electronic device.

[Appendix 18] The program according to Appendix 16 or 17, in which the selection process is a process of selecting the first guidance information as the guidance information when the update error has occurred due to an interruption of communication with the in-vehicle electronic device and the in-vehicle electronic device is switchable ON and OFF in conjunction with an operation on a power switch of the vehicle.

[Appendix 19] The program according to any one of Appendices 16 to 18, in which the selection process is a process of selecting the first guidance information as the guidance information when the update error has occurred due to an interruption of communication between the vehicle and an external distribution center configured to distribute software update data.

[Appendix 20] The program according to any one of Appendices 16 to 19, in which the second guidance information is selected as the guidance information when the update error has occurred through determination that an electronic signature assigned to software update data is not a valid signature.

[Appendix 21] The program according to any one of Appendices 16 to 20, in which the second guidance information is selected as the guidance information when the update error has occurred due to a hardware malfunction of the in-vehicle electronic device.

[Appendix 22] The program according to any one of Appendices 16 to 21, in which the second guidance information is selected as the guidance information when the update error has recurred after display of the first guidance information.

[Appendix 23] A non-transitory storage medium storing the program according to any one of Appendices 16 to 22.

What is claimed is:

1. An information processing device configured to control a display unit configured to display information on software update for an in-vehicle electronic device, the information processing device comprising a circuitry configured to:

display guidance information on the display unit under a condition that an update error in which the software update is not performable properly has occurred; and select first guidance information or second guidance information to be displayed on the display unit as the guidance information based on a situation in which the update error has occurred, the first guidance information indicating a procedure for resolving the update error that is practicable by a user of a vehicle, the second guidance information indicating that the vehicle needs to be brought to a dealer, wherein the circuitry is configured to select the second guidance information as the guidance information under a condition that the update error has occurred through determination that an electronic signature assigned to software update data is not a valid signature.

2. The information processing device according to claim 1, wherein the circuitry is configured to select the first guidance information as the guidance information under a condition that the update error has occurred due to an interruption of communication with the in-vehicle electronic device.

3. The information processing device according to claim 1, wherein the circuitry is configured to select the first guidance information as the guidance information under a condition that the update error has occurred due to an interruption of communication with the in-vehicle electronic device and the in-vehicle electronic device is switchable ON and OFF in conjunction with an operation on a power switch of the vehicle.

4. The information processing device according to claim 1, wherein the circuitry is configured to select the first guidance information as the guidance information under a condition that the update error has occurred due to an interruption of communication between the vehicle and an external distribution center configured to distribute the software update data.

5. The information processing device according to claim 1, wherein the circuitry is configured to select the second guidance information as the guidance information under a condition that the update error has occurred due to a hardware malfunction of the in-vehicle electronic device.

6. The information processing device according to claim 1, wherein the circuitry is configured to select the second guidance information as the guidance information under a condition that the update error has recurred after display of the first guidance information.

7. A vehicle comprising the information processing device according to claim 1.

8. An information processing method for controlling a display unit configured to display information on software update for an in-vehicle electronic device, the information processing method comprising:

displaying guidance information under a condition that an update error in which the software update is not performable properly has occurred; and selecting first guidance information or second guidance information to be displayed on the display unit as the guidance information based on a situation in which the update error has occurred, the first guidance information indicating a procedure for resolving the update error that is practicable by a user of a vehicle, the second guidance information indicating that the vehicle needs to be brought to a dealer, wherein the second guidance information is selected as the guidance information under a condition that the update error has occurred through determination that an electronic signature assigned to software update data is not a valid signature.

9. A non-transitory storage medium storing instructions that are executable by one or more processors and that cause the one or more processors to perform functions comprising:

displaying guidance information on a display unit configured to display information on software update for an in-vehicle electronic device under a condition that an update error in which the software update is not performable properly has occurred; and selecting first guidance information or second guidance information to be displayed on the display unit as the guidance information based on a situation in which the update error has occurred, the first guidance information indicating a procedure for resolving the update error that is practicable by a user of a vehicle, the second guidance information indicating that the vehicle needs to be brought to a dealer, wherein the second guidance information is selected as the guidance information under a condition that the update error has occurred through determination that an electronic signature assigned to software update data is not a valid signature.

* * * * *